United States Patent
Neuhaeusler

(10) Patent No.: US 7,826,483 B2
(45) Date of Patent: Nov. 2, 2010

(54) METHOD FOR ASSIGNING A NUMBER OF M DATA LINKS LOCATED ON THE SUBSCRIBER SIDE TO A NUMBER OF N DATA LINKS LOCATED ON THE TRANSPORTER SIDE

(75) Inventor: Chlodwig Neuhaeusler, Woerthsee (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 626 days.

(21) Appl. No.: 11/587,459

(22) PCT Filed: Mar. 16, 2005

(86) PCT No.: PCT/EP2005/002771
§ 371 (c)(1),
(2), (4) Date: Oct. 25, 2006

(87) PCT Pub. No.: WO2005/104468
PCT Pub. Date: Nov. 3, 2005

(65) Prior Publication Data
US 2007/0242674 A1    Oct. 18, 2007

(30) Foreign Application Priority Data
Apr. 26, 2004    (DE)    ........................ 10 2004 020 288

(51) Int. Cl.
*H04J 3/16* (2006.01)
(52) U.S. Cl. .................... 370/468; 370/395.4
(58) Field of Classification Search ......... 370/230–235, 370/237, 395.53, 466, 468
See application file for complete search history.

(56) References Cited

U.S. PATENT DOCUMENTS 5,650,998 A * 7/1997 Angenot et al. ............. 370/225

(Continued)

FOREIGN PATENT DOCUMENTS

EP    1337078    8/2003

OTHER PUBLICATIONS

Modellierung und Bewertung von Verfahren zur Last- und Leistungsregelung in Steuereinheiten von B-IDSN/ATM Vermittlungssystemen, Albrecht B. Schwarz—2002 "Modelling and Evaluation of Load and Performance Control Mechanisms of B-ISDN/ATM Switching Systems", 2002 pp. 1-272.

*Primary Examiner*—Dang T Ton
*Assistant Examiner*—Kevin Lee
(74) *Attorney, Agent, or Firm*—Laurence A. Greenberg; Werner H. Stemer; Ralph E. Locher

(57) ABSTRACT

In a method for assigning a number of M data links located on a subscriber side to a number of N data links located on a transport side, each of the M data links located on the subscriber side is initially assigned to one of the N data links located on the transport side. A weighting value representing their capacity utilization is dynamically determined for each of the N data links located on the transport side. The weighting value is calculated from at least one of a number of assigned data links located on the subscriber side and data load currently being handled via the data link located on the transport side. At least one of the data links already assigned and new data links located on the subscriber side are assigned to the available data links located on the transport side in accordance with the weighting values.

8 Claims, 4 Drawing Sheets

U.S. PATENT DOCUMENTS

| | | |
|---|---|---|
| 5,946,313 A | 8/1999 | Allan et al. |
| 6,393,003 B1 * | 5/2002 | Lee .............................. 370/331 |
| 6,393,506 B1 | 5/2002 | Kenny |
| 6,553,020 B1 | 4/2003 | Hughes et al. |
| 6,693,766 B1 * | 2/2004 | Wilkes et al. ............ 360/78.08 |
| 6,735,172 B1 * | 5/2004 | Gibbs et al. .................. 370/235 |
| 6,917,614 B1 * | 7/2005 | Laubach et al. ............. 370/392 |
| 7,023,856 B1 * | 4/2006 | Washabaugh et al. .... 370/395.1 |
| 7,203,461 B2 * | 4/2007 | Chang et al. .............. 455/67.13 |
| 7,239,608 B2 * | 7/2007 | Sreejith et al. ............... 370/230 |
| 2005/0228967 A1 * | 10/2005 | Hirairi ........................... 712/1 |

* cited by examiner

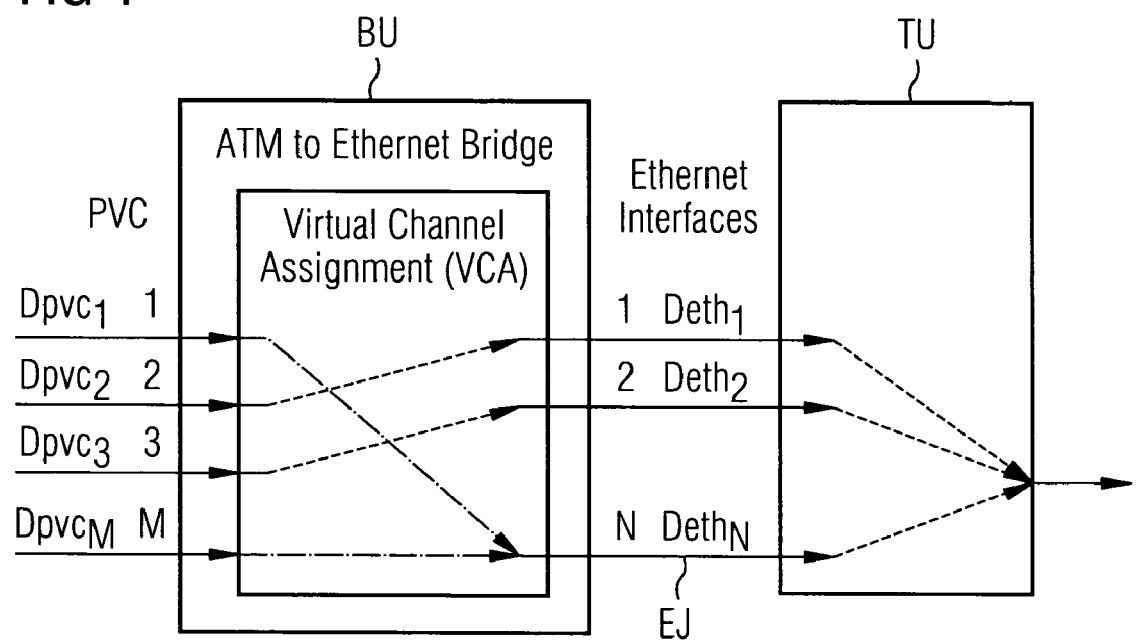

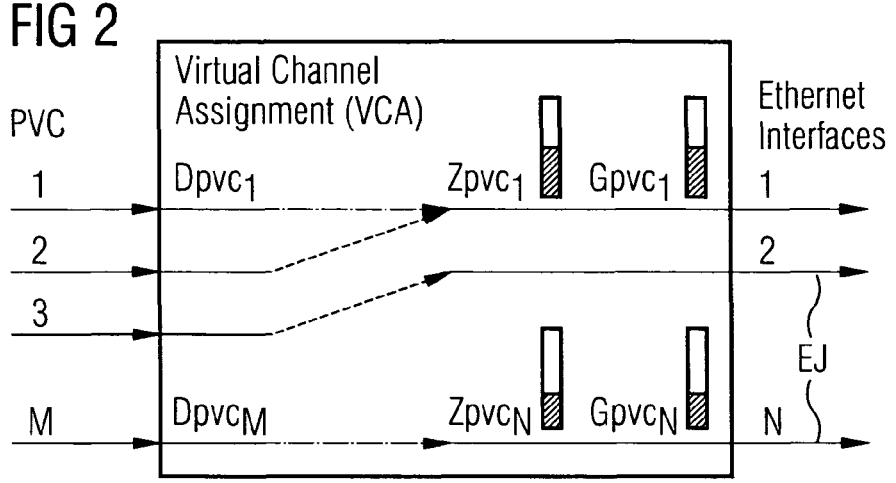
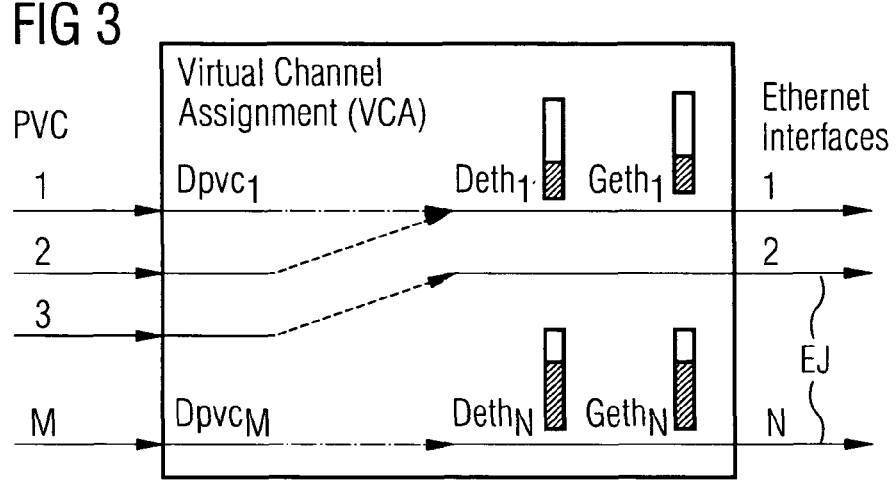
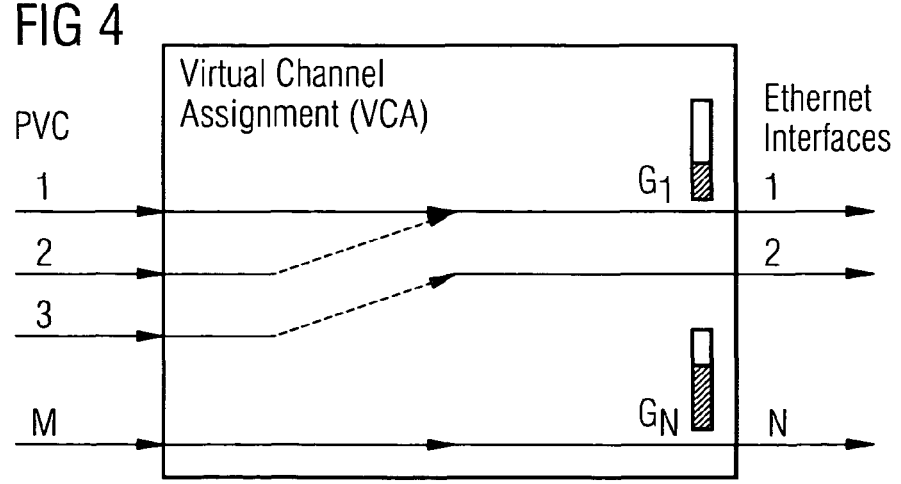

METHOD FOR ASSIGNING A NUMBER OF M DATA LINKS LOCATED ON THE SUBSCRIBER SIDE TO A NUMBER OF N DATA LINKS LOCATED ON THE TRANSPORTER SIDE

BACKGROUND OF THE INVENTION

The invention relates to a method for assigning a number of M data links located on the subscriber side, in particular ATM links, to a number of N data links located on the transport side such as, for instance, Ethernet links.

In particular in Ethernet networks, mainly in the WAN (WAN: Wide Area Network) domain, increasing use is being made of network elements that are interconnected by means of N parallel (bundled) Ethernet lines. Said Ethernet lines as a rule operate in each case in full-duplex mode and employ the same data rate. The necessary bundling of the N data streams in the receive direction and splitting into N data streams in the transmit direction is performed by the respective network element (a router or switch, for example).

This approach offers numerous advantages compared to a single link. It makes the overall link more failsafe, which impacts positively on its availability. Should-one of the N links fail, the data stream can be conveyed over the remaining N−1 links. There is also a cost advantage compared to a single link employing a high bit rate. It is often more favorable to install N links having a respective data rate D than to install a single link having the data rate N×D. Moreover, increased bandwidths can be implemented in existing networks because parallel networks or cabling arrangements are often already present that have hitherto been used only as single links. Being able to bundle data streams thus allows the existing infrastructure (cabling) to be retained but the data rate handled thereover to be increased. This solution further presents an additional option to the effect that a link's data rate can be matched in steps to the actual volume of data traffic by optionally adding further link lines. Thus the advantage can be gained thereby of not having to change up to the next generation of the networking standard (from 100Base-T to 1000Base-T, for example) if there is a bottleneck in the transmission capacity, but instead of being able to increase the data rate capacity in quite small steps in keeping with what is needed.

This approach to better utilizing the existing infrastructure is now also being applied increasingly in the area of what are termed Ethernet DSLAMs (DSLAM: Digital Subscriber Line Access Multiplexer). In traffic toward the backbone network (referred to below as upstream data traffic), DSLAMs of said type terminate incoming ATM data traffic and forward the Ethernet data frames contained therein to a router via one of the N Ethernet interfaces. In traffic toward the subscriber (referred to below as downstream data traffic), independently of the interface of their origin the arriving Ethernet frames are assigned on the basis of their target MAC address to the ATM link associated therewith, packed into AAL5 frames, and forwarded as ATM data traffic to the desired addressee (subscriber). The DSLAM thus performs a bridging function between the ATM layer and Ethernet layer (ATM to Ethernet bridge).

For the downstream data traffic there is thus a clear assignment of how to route the original Ethernet frames to the subscriber based on an assignment table (MAC addresses to ATM links). This task is thus the same for all Ethernet DSLAMs regardless of the number of available Ethernet interfaces on the transport side.

This matter is still unresolved for the upstream data traffic that has to be conveyed, for example, over the available Ethernet interfaces on the transport side to the backbone network. What can be problematic therein is that if an Ethernet interface fails owing to a fault or following an administratively initiated interface deactivation the ATM links on the subscriber side that were previously assigned to said Ethernet interface must in a suitable manner be re-linked on the transport side so as to avoid interrupting any data traffic possibly being handled. Conversely, it is of course also necessary for a deactivated Ethernet interface to be returned to operation as soon as possible after being successfully reactivated and to be incorporated into the data exchange process.

SUMMARY OF THE INVENTION

The object of the invention is thus to disclose a method for managing upstream data traffic between links located on the subscriber side such as, for example ATM links, and the data links located on the transport side such as, for example, Ethernet interfaces, by means of which method the available network resources can be utilized particularly efficiently and without interruptions.

Said object is inventively achieved using a method for assigning a number of M data links located on the subscriber side, in particular ATM links, to a number of N data links located on the transport side, in particular Ethernet interfaces, wherein:

a) each of the M data links located on the subscriber side is initially assigned to one of the N data links located on the transport side;

b) a weighting value representing the actually possible capacity utilization is dynamically determined for each of the N data links located on the transport side, with said weighting value being calculated from the number of assigned data links located on the subscriber side and/or from the data load currently being handled via the data link located on the transport side; and c) the data links already assigned and/or new data links located on the subscriber side are assigned to the available data links located on the transport side in accordance with the weighting values.

The data links located on the subscriber side are in this way first assigned to the data links located on the transport side based on empirical experience in order, for example, to achieve even utilization of the capacity of the data links located on the transport side. In the context of the present invention the term "data link located on the transport side" first and foremost also means the data interface via which the data traffic from the subscriber to the backbone network is handled, which is to say an Ethernet interface, for example. Based on the calculation of the weighting value it is thus possible to make a statement about the actual data traffic that has already been handled or, as the case may be, a prediction about data traffic possibly occurring on the current assignment so that the capacity of the available interfaces with their data links, located on the transport side, to the backbone network is utilized as evenly as possible and, where applicable, equipped with a convenient reserve.

For forming the weighting value there can of course be different strategies based on empirical experience. One strategy reflecting the actual situation very well can, for calculating the weighting value, provide for the current data load to be emphasized more strongly than the load theoretically possible based on the assigned number of links located on the subscriber side. The current data load can herein, for example, be included in the weighting value in quadratic form. Other weighting dependencies are, though, also possible of course.

In an expedient development of the invention a data link requiring to be newly created located on the subscriber side can be assigned to the data link having the lowest weighting value on the transport side. The data link on the transport side having the greatest capacity utilization reserves based on its weighting value will thus be used first. If all the data links located on the transport side have approximately the same weighting values it will be necessary to establish a sequence for the relevant assignment, specifying, for example, that use is to be made first of the data link on the transport side having the first counting index. Also conceivable, though, are assignments in which the data link which, for example, can most easily be changed over to a higher transmission standard is selected first.

A further expedient embodiment of the invention can, should a data link located on the transport side fail, provide for the data links located on the subscriber side that are assigned to said failed data link to be redistributed in accordance with the weighting values calculated for the remaining data links located on the transport side. Thus what was said above basically applies here, also, to the distribution of the required transmission rate among the available data links located on the transport side. The assignment method can also be in keeping with the criteria already explained above.

A procedure according to the basically already known scheme is likewise advantageous when a deactivated data link located on the transport side is reactivated. When a data link located on the transport side is added, the data links located on the subscriber side that have been assigned to the previously available data links located on the transport side will therefore be partially redistributed in accordance with the weighting values calculated for the data links located on the transport side. Specifically, that means that initially the data links located on the transport side that have the highest weighting values will be relieved and be rejumpered from said data links located on the subscriber side to the newly added data link located on the transport side.

When the weighting value is being calculated, suitable account matched to need will be taken of the number of data links located on the subscriber side that are assigned to a data link located on the transport side if, in terms of the data links located on the subscriber side that are assigned to a data link located on the transport side, the weighting value exhibits a linear relationship with the number of assigned data links located on the subscriber side.

When the weighting value is being calculated, suitable account matched to need will be taken of the data load handled via a data link located on the transport side if, for calculating the weighting value, a normalized data rate averaged over time having a predeterminable length of a previous interrogation interval is determined in terms of the data load handled via a data link located on the transport side. Brief fluctuation effects will be suppressed through said averaging over time, as a result of which the data link located on the transport side can be assigned a data rate having a predeterminable reserve capacity so that, specifically, briefly increased data rates can still be transmitted.

So that the potential hazard of a data link, located on the subscriber side, that is currently idling can basically also be taken suitably into account when the weighting value is being calculated, for calculating the weighting value provision can be made for employing a lower weighting element, different from zero, of the weighting value in terms of the data load handled over a data link located on the transport side for a currently unused data link located on the subscriber side.

It can further be provided for the weighting value element determined in terms of the data load handled via a data link located on the transport side and the weighting value element determined in terms of the number of data links located on the subscriber side that are assigned to a data link located on the transport side to be used with a different weight for determining the (overall) weighting value. Thus, for example, two thirds of the load-dependent element can be used for the overall weighting value and one third of the purely numerical element of the assigned data links located on the subscriber side.

Further advantageous embodiments of the invention can be derived from the remaining dependent claims.

BRIEF DESCRIPTION OF THE SEVERAL VIEWS OF THE DRAWINGS

Exemplary embodiments of the present invention will be explained in more detail with reference to a drawing, in which:

FIG. 1 is a schematic of the assignment of subscriber lines to transport lines;

FIG. 2 is a schematic of a first method for assigning subscriber lines to transport lines;

FIG. 3 is a schematic of a second method for assigning subscriber lines to transport lines;

FIG. 4 is a schematic of a third method for assigning subscriber lines to transport lines;

DETAILED DESCRIPTION OF THE INVENTION

Figure 5:
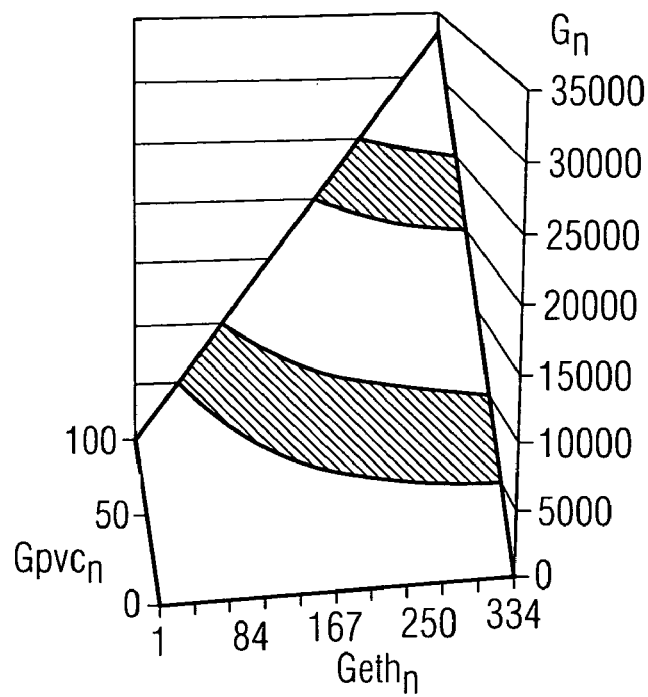
FIG. 5 shows a curve of the overall weight as a function of the partial weight determined for the number of assigned subscriber lines and of the partial weight determined for the data rate with a linear weighting of the data rate.

FIG. 1 is a schematic of a number of M subscriber links PVC (Permanent Virtual Connection) that are assigned in a bridge unit BU to a number of N transport links EI by means of an assignment method (what is termed Virtual Channel Assignment VCA) before the data traffic handled via the transport links EI is fed into a backbone communication network (not further illustrated here) by means of a transmission unit TU. In the present exemplary embodiment the data links located on the subscriber side, in this case the subscriber links PVC, are packet-oriented ATM links operating according to the AAL5 protocol. The data links located on the transport side, in this case the transport links EI, are Ethernet interfaces operating according to the IEEE802.3 Ethernet standard. The bridge unit BU is what is termed an ATM to Ethernet bridge, in which, inter alia, on the one hand the subscriber links PVC are assigned to the transport links EI and, on the other, the Ethernet frames are unpacked from the ATM/AAL5 frames in the upstream direction and the Ethernet frames are packed into ATM/AAL5 frames in the downstream direction. The data rate handled via the Ethernet interfaces is here transmitted by means of what is termed an aggregation router into a backbone network operating according to the IP standard.

The inventive assignment method is basically embodied such that the upstream data load of the M ATM subscriber links PVC is distributed as evenly as possible among the N available Ethernet interfaces EI, with operating states being avoided in which individual interfaces go into overload states while others are possibly only operated with partial loading. The assignment method furthermore insures that if one Ethernet interface should fail the subscriber links PVC assigned to said Ethernet interface EI will be rejumpered onto the remaining active Ethernet interfaces EI. Furthermore, when a deactivated Ethernet interface EI has been reactivated the subscriber links PVC that were assigned to the other Ethernet interfaces will in part be redirected to the reactivated Ethernet interface EI so that the end result achieved will be the re-establishing of an even load distribution across all Ethernet interfaces EI.

A first embodiment of the inventive assignment method is shown schematically in FIG. 2. A counter that registers the number $Zpvc_n$ of subscriber links PVC currently assigned to an Ethernet interface EI is implemented by software means for each Ethernet interface EI, with a weighting value $Gpvc_n$, corresponding in the present case to the number of assigned subscriber links PVC, which is to say $Gpvc_n = Zpvc_n$, then being determined for each Ethernet interface EI. If all Ethernet interfaces EI have been weighted equally, a further subscriber link PVC will be assigned to the Ethernet interface EI having the lowest counting index n. If an Ethernet interface EI fails, the subscriber links PVC assigned thereto will be redistributed among the still active, other Ethernet interfaces EI, with their current weight $Gpvc_n$ being taken into account accordingly. If, conversely, a deactivated Ethernet interface EI is then reactivated, subscriber links PVC will be redirected from the Ethernet interfaces EI having the currently highest weighting values $Gpvc_n$ to said "new" reactivated Ethernet interface until as even as possible weighting values $Gpvc_n$ have again been achieved for all active Ethernet interfaces EI.

What is thus insured by means of said first embodiment is that even maximum utilization of the capacity of the N Ethernet interfaces will on average be achieved in the case of applications having a uniform permissible maximum data rate $Dpvc\text{-}max_m$ for each subscriber link. Said embodiment does not, though, take account of the actual capacity utilization $Deth_n$ of the Ethernet interfaces EI at the time a subscriber link, which can be produced and also removed again administratively, is newly created. Said embodiment can hence disadvantageously result in an imbalance in the distribution of the load among the available Ethernet interfaces EI due to the in each case different use made of the possible maximum permissible data rate $Dpvc\text{-}max_m$ by the subscribers. That is the point at which the second embodiment, described below, then comes into play.

The assignment method shown schematically in FIG. 3 is a second embodiment of the invention wherein a counter for the bytes sent is implemented by software means for each Ethernet interface EI, which is to say the Ethernet frames sent and their respective length are registered by the counter. A method is furthermore implemented by software means wherein said counters are interrogated cyclically and, based on the length of the interrogation interval and the bytes sent therein, a mean data rate $Deth_n$ is determined for each Ethernet interface EI over the previous interrogation interval. Further procedural steps are accordingly as follows:

For each Ethernet interface EI the mean data rate $Deth_n$ over the last interrogation interval thus supplies the component for forming a load-dependent weighting value $Geth_n$, which is expediently scaled with a scaling value Dscal and normalized. Dscal thus assumes values from an interval of >0 kbit/s to Deth-max, with Deth-max being the maximum data rate that can be transported over an Ethernet interface. In ongoing operation a new subscriber link $PVC_m$ is therefore assigned to the Ethernet interface EI having the lowest weighting value $Geth_n$. If all Ethernet interfaces EI have been weighted approximately equally, then assignment will be to the Ethernet interface EI having the lowest index n.

In the event that a deactivated Ethernet interface EI is reactivated, an option is further provided for in part redistributing the data volume distributed among the already active Ethernet interfaces to include the reactivated Ethernet interface so that even weighting/loading of all then active Ethernet interfaces EI will thereafter be re-established. A counter for the sent bytes is for this purpose implemented also for all subscriber links PVC. For ATM links this can mean that the bytes of the Ethernet frames will be exclusively registered when the AALS frames have been reassembled. Said counters are also interrogated cyclically and, based on the length of the interrogation interval and the bytes sent over the interrogation interval, the mean data rate $Dpvc_m$ is determined for each subscriber link PVC over the previous interrogation interval. So if a deactivated Ethernet interface EI is then reactivated, subscriber links PVC, whose mean data rates $Dpvc_m$ are of course known, will be successively rejumpered from the hitherto already active Ethernet interfaces EI to the reactivated Ethernet interface EI until their weighting value $Geth_n$ has risen to the new, then attained mean weighting value. With this assignment method it is nevertheless also insured that none of the weighting values of the thus relieved originally active Ethernet interfaces EI will fall below the mean weighting value of all Ethernet interfaces EI in operation.

With reference to FIG. 3, shown there by way of example is that the subscriber link PVC2 is assigned to the Ethernet interface $EI_1$ and not, for instance, to the Ethernet interface $EI_N$ which, owing to the assignment of the subscriber link $PVC_M$, has a higher weighting value $Geth_N$ than the Ethernet interface $EI_1$, with its weighting value $Geth_1$.

With this approach to a solution, even utilization of the capacity of the Ethernet interfaces EI will in any event be achieved whenever the subscriber links are supplying more or less continuous data streams. A subscriber link PVC requiring to be newly created will therefore always be assigned to the Ethernet interface EI that currently has the lowest weighting value $Geth_n$. Said approach can, though, exhibit a certain disadvantage if none of the subscriber links PVC already assigned to the Ethernet interface EI having the currently lowest weighting value is conveying data toward the backbone network when a new subscriber link $PVC_m$ is created. According to said approach, subscriber links requiring to be newly created would therefore always be assigned to the Ethernet interface $EI_1$ having the lowest weighting value or, if all Ethernet interfaces EI currently have the weighting value $Geth_n=0$, to the Ethernet interface EI having the lowest counting index. A data stream thereupon starting on the subscriber links PVC could then suddenly lead to overloading of one or more of the Ethernet interfaces EI.

Finally, a third inventive assignment method constitutes a combination of the two previously presented solutions, as a result of which the advantages of the two individual solutions can be retained but their disadvantageous effects avoided. A core element of said third method is thus the forming of a product weight $G_n$ from the two weighting values $Gpvc_n$ and $Geth_n$. In order to reliably preclude "malfunctioning" of the second approach to a solution when $Deth_n=0$, a minimum load-dependent weighting value Geth-min>0 is established as a safeguard against the "potential hazard" of inactive subscriber links PVC. For the assignment of a new subscriber link PVC to an Ethernet interface EI it is in this way insured that both the potentially possible data load due to the already assigned subscriber links PVC and the current data load can be adequately taken into account for the assignment.

Especially in the case of applications where the sum of the maximum possible data rate $\Sigma$ Dpvc-max$_m$ of the subscriber links PVC$_m$, $1 \leq m \leq M$, is greater than the sum of the maximum possible data rates $\Sigma$ Deth-max$_n$ of the Ethernet interfaces EI$_n$, $1 \leq n \leq N$, it is necessary where the assignment strategy is concerned to pay commensurately more attention to the respectively current utilization of the capacity of the Ethernet interfaces EI. For this reason, especially with applications of this type, the load-dependent component Geth$_n$ of the product weight G$_n$ is emphasized more strongly. Such emphasizing can provide for the load-dependent component Geth$_n$ to be included in the overall weight G$_n$ in quadratic form. Fixed linear weighting in the ratio of ⅔ to ⅓ in favor of the load-dependent weighting value Geth$_n$ as against the purely numerical weighting value Gpvc$_n$ could, though, also be provided.

The assignment rules ensuing from this approach are thus similar in structure to those applying to the two preceding assignment methods. A subscriber link PVC$_m$ requiring to be newly created is assigned to the Ethernet interface EI$_n$ having the lowest product weight G$_n$, which is shown by way of example in FIG. 4 for the assignment of the subscriber link PVC$_2$ to the Ethernet interface EI$_1$. If all Ethernet interfaces EI have been "loaded" with approximately the same product weight G$_n$, then assignment will be to the Ethernet interface EI$_1$ having the lowest counting index n. Should an Ethernet interface EI then fail, the subscriber links PVC assigned thereto will be redistributed among the other, active Ethernet interfaces EI, with their current product weight G$_n$ being taken into account accordingly. In the converse case of an added Ethernet interface EI, subscriber links PVC will be rejumpered from the hitherto active Ethernet interfaces to said new Ethernet interface until their weight has risen to the now applicable mean product weight of all Ethernet interfaces. It is at the same time insured that the product weight G$_n$. Of the now relieved Ethernet interfaces will not fall below said mean product weight.

Figure 6:
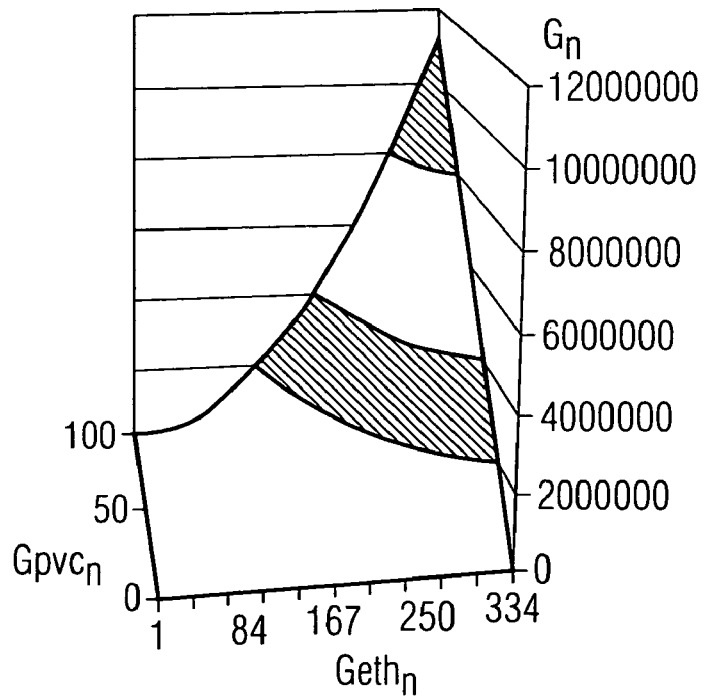
FIG. 6 shows a curve of the overall weight as a function of the partial weight determined for the number of assigned subscriber lines and of the partial weight determined for the data rate with a quadratic weighting of the data rate.

The graphs in FIGS. 5 and 6 show the curve of the product weight G$_n$ as a function of the numerical weighting value Gpvc$_n$ and of the weighting value Geth$_n$, which is dependent on the data rate, with FIG. 5 showing the situation for linear weighting of the data rate and FIG. 6 the situation for quadratic weighting of the data rate. A maximum value of 100 (M=100) has therein been assumed for the numerical weighting value Gpvc$_n$ and a maximum weight of 333 (Deth-max=100 Mbit/s; Dscal=300 kbit/s) for the weighting value Geth$_n$ dependent on the data rate.

Figure 7:
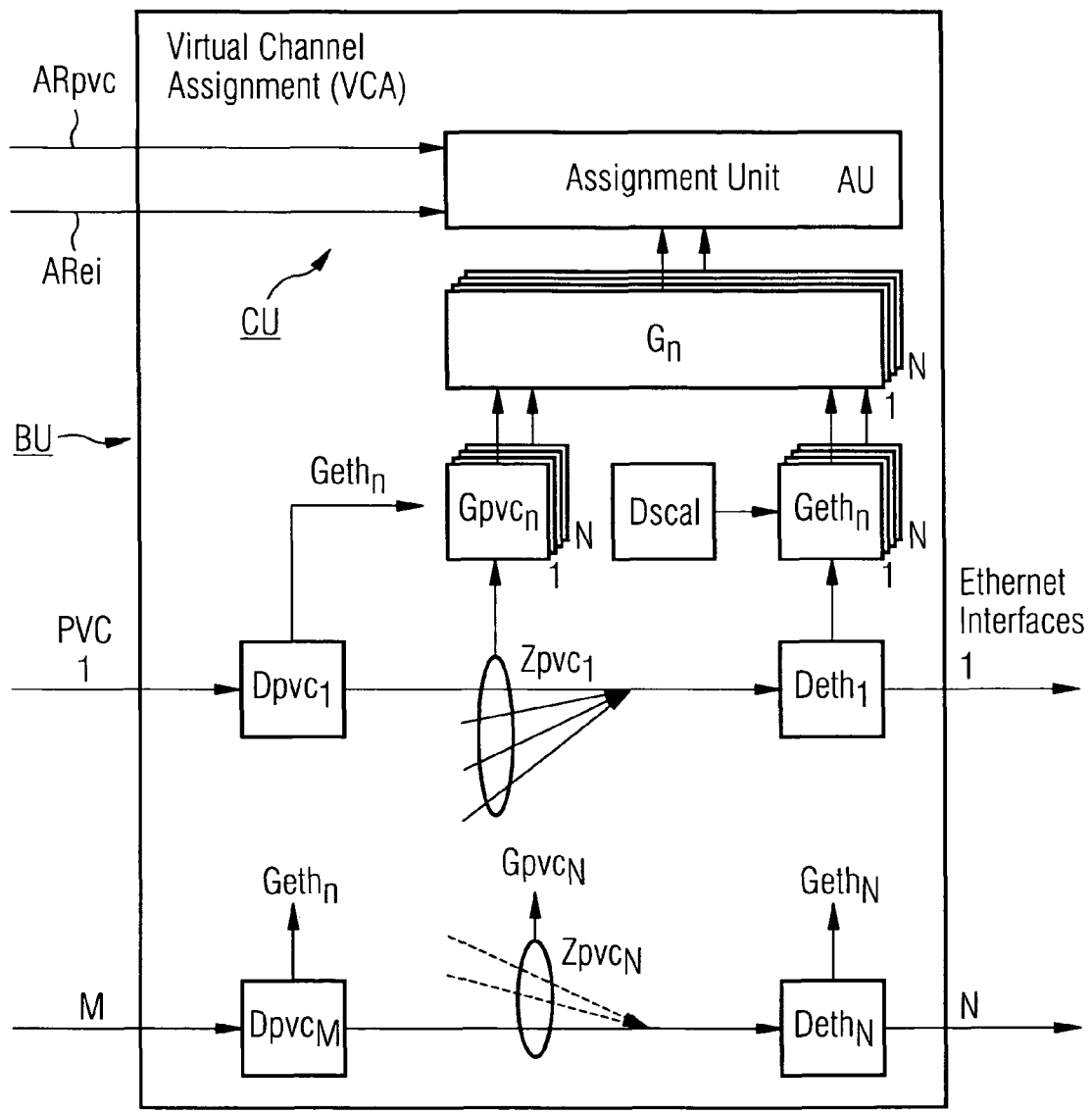
FIG. 7 is a schematic of the structure of a controller in the bridge unit.

FIG. 7 is a schematic of the structure of a controller unit CU for assigning the subscriber links PVC to the Ethernet interfaces EI in the bridge unit BU. The assignment method is referred to also as Virtual Channel Assignment (VCA). Two processors are customarily operated on a controller unit CU of said type. The main processor is responsible for organizational, administrative and management functions (what are termed OAM functions) within the system as a whole and for controlling a slave processor, termed a network processor, which is employed in the widest sense for the bridging functions, in this case "ATM to Ethernet bridging". A controller unit CU of said type enables up to M=4095 ATM subscriber links PVC to be created that each have to be assigned to one of the N=4 available 100Base–T Ethernet interfaces EI.

The above-described methods can therefore be used for the function of link assigning. The third assignment method is indicated schematically in the representation according to FIG. 7 because both the numerical weighting value Gpvc$_n$ and the weighting value Geth$_n$ dependent on the data rate are included in determining the product weight G$_n$ of an Ethernet interface EI$_n$. An assignment unit AU of the controller unit CU is where new inquiries AR$_{pvc}$ for creating new data links on the subscriber side and inquiries AR$_{ei}$ for reactivating/deactivating Ethernet interfaces EI are administered and the subscriber links PVC or, as the case may be, Ethernet interfaces EI are assigned according to the above-described methods.

The invention claimed is:

1. A method for assigning a number of M data links located on a subscriber side to a number of N data links located on a transport side, comprising:
   initially assigning each of the M data links located on the subscriber side to one of the N data links located on the transport side wherein N is larger than 2;
   dynamically determining a product weight and a load-depending weighting value and a numerical weighting value representing their capacity utilization for each of the N data links located on the transport side, with said numerical weighting value being calculated from the number of assigned data links located on the subscriber side and with said load-depending weighting value being calculated from the data load currently being handled via the data link located on the transport side and with said product weight being calculated from the numerical weighting value and the load-depending weighting value;
   assigning the data links already assigned and/or new data links located on the subscriber side to the data links located on the transport side in accordance with the product weight;
   in terms of the data links located on the subscriber side that are assigned to a data link located on the transport side the numerical weighting value exhibiting a linear relationship with the number of assigned data links located on the subscriber side; and
   for calculating the load-depending weighting value, a lower weighting element, different from zero, is employed to represent the data load handled over a data link located on the transport side for a currently unused data link located on the subscriber side.

2. The method as claimed in claim 1, wherein for calculating the product weight the current data load is emphasized more strongly than a theoretical load based on the assigned number of links located on the subscriber side.

3. The method as claimed in claim 2, wherein the current data load is included in the product weight in quadratic form.

4. The method as claimed in one in claim 1, wherein a data link requiring to be newly created located on the subscriber side is assigned to the data link having the lowest product weight on the transport side.

5. The method as claimed in claim 1, wherein should a data link located on the transport side fail, the data links located on the subscriber side that are assigned to said failed data link will be redistributed in accordance with the product weight calculated for the remaining data links located on the transport side.

6. The method as claimed in claim 1, wherein when a data link located on the transport side is added, the data links located on the subscriber side that have been assigned to the data links located on the transport side will be partially redistributed in accordance with the product weight calculated for the data links located on the transport side.

7. The method as claimed in claim 1, wherein for calculating the load-depending weighting value a normalized data rate averaged over time having a predetermined length of a previous interrogation interval is determined in terms of the data load handled via a data link located on the transport side.

8. The method as claimed in claim 1, wherein the load-depending weighting value determined in terms of the data load handled via the data link located on the transport side and the numerical weighting value determined in terms of the number of data links located on the subscriber side that are assigned to a data link located on the transport side are used with a different weight for determining the product weight.

* * * * *